United States Patent [19]
Campbell

[11] Patent Number: 5,264,232
[45] Date of Patent: Nov. 23, 1993

[54] METHOD OF DIVIDING A SINGLE STREAM OF BAKER'S DOUGH INTO SEPARATE STREAMS OF EQUAL WEIGHT

[76] Inventor: Sterrett P. Campbell, 995 Peachtree Dunwoody Ct., Atlanta, Ga. 30328

[21] Appl. No.: 932,373

[22] Filed: Aug. 19, 1992

[51] Int. Cl.$^5$ .............................................. A21D 6/00
[52] U.S. Cl. ................................... 426/503; 425/311; 426/517; 426/518
[58] Field of Search ............... 426/503, 504, 496, 516, 426/517, 518; 425/202, 204, 311

[56] References Cited
U.S. PATENT DOCUMENTS 4,948,611  8/1990  Cummings ........................... 426/503
5,070,185 12/1991  Stanks ............................. 264/177.17

Primary Examiner—George Yeung
Attorney, Agent, or Firm—Hopkins & Thomas

[57] ABSTRACT

Dough (20) is delivered in a stream through inlet conduit (29) to dough distribution chamber (60) of manifold (10). A spike (52) pierces the oncoming dough stream, and the dough flares radially into an annulus, past adjustable deflectors (42a-42f), and the dough is sliced by dough divider sharps (62) to separate the dough into individual streams of dough that move through delivery conduits (30a-30f). The velocity of dough moving through each delivery conduit (30a-30f) is controlled by the adjustable deflectors (42a-42f) which are positioned at the perimeter of the dough distribution chamber (60).

7 Claims, 4 Drawing Sheets

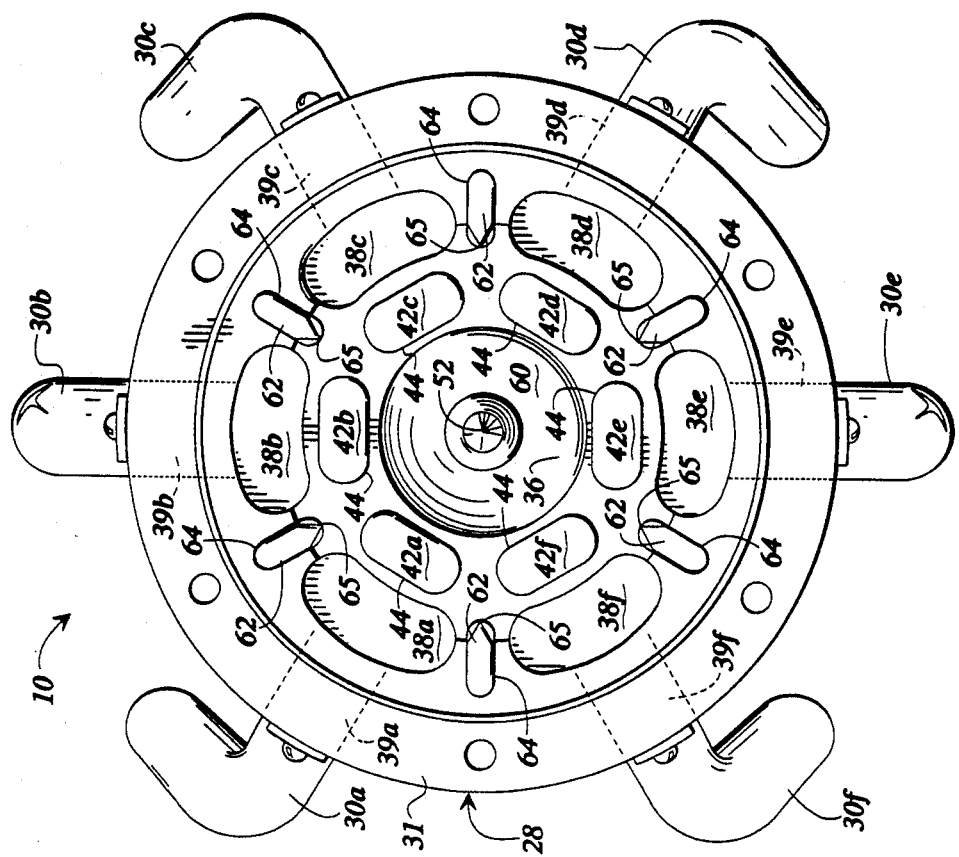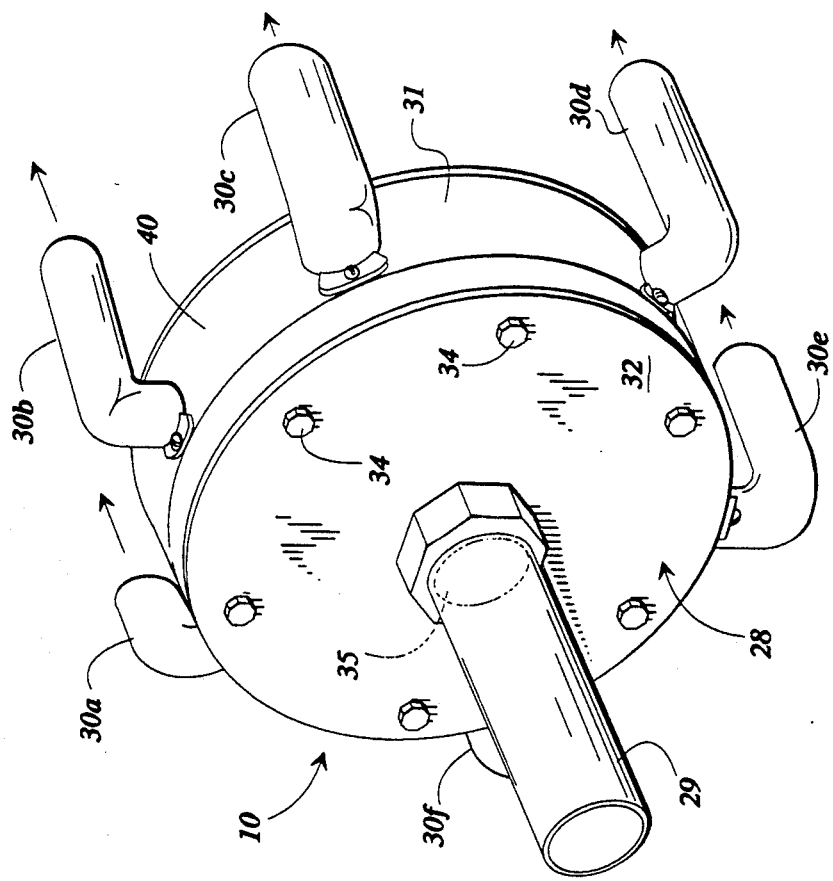

METHOD OF DIVIDING A SINGLE STREAM OF BAKER'S DOUGH INTO SEPARATE STREAMS OF EQUAL WEIGHT

FIELD OF INVENTION

The invention disclosed herein relates to the handling of baker's dough during the continuous dough handling process in which the dough is first mixed, then is pressurized in a stuffing pump, is separated into a plurality of streams, and each stream is cut into segments of dough that are carried on a surface conveyor system during rounding, proofing and baking. More particularly, the invention relates to a distribution manifold which receives the moving stream of dough and subdivides the dough into several streams for delivery to a dough divider and rounder bar system.

BACKGROUND OF THE INVENTION

When baker's dough is mixed, usually it is blended in a large mixer and the batch of dough developed in the mixer is at a density of approximately 69 pounds per cubic foot. The dough must be transferred from the mixer to a stuffing pump and the stuffing pump progressively pressurizes the batch of dough to form the dough into a stream that moves through subsequent dough handling equipment, such as a metering pump, a dough distribution manifold, a dough divider, and onto the surface conveyor of a rounder bar system. Once the dough has been mixed, the dough begins to develop $CO_2$ and expand or "rise" as it ages, and as the dough is being handled by the prior art stuffing pumps and subsequent processing equipment leading to the dough divider, the dough is sheared, torn, stretched, held in elevated pressures and otherwise handled in a manner that tends to deteriorate the gluten structure of the dough. Maintaining the gluten structure is essential in providing a final product which has uniform grain structure. Therefore, it is important in the handling of the stream of pressurized dough that the dough not be unnecessarily stretched, torn or sheared and held at elevated pressures.

Preferably, the stream of pressurized dough should pass through as few constrictions and changes of direction as is practical so as to avoid tearing, stretching and shearing and to avoid the requirement of high pressure to transport the dough and to avoid large pressure drops. Further, it is desirable to maintain the dough under high pressure for as short a period of time as is practical so as to avoid deterioration of the dough.

A common practice for subdividing a stream of baker's dough moved by the stuffing pump of a dough handling system has been to move the stream of dough into a common manifold and exhaust the dough from several outlet ports of the manifold into separate conduits and to deliver the dough from the several conduits to a dough divider that continually slices each subdivided stream into dough balls. One of the major problems with the prior art systems is the accurate control of the dough as it moves through the manifold and to the dough divider. It is important that the dough be delivered through each conduit to the dough divider at substantially equal masses so that when the streams of dough are separated into dough balls by the dough divider, each dough ball will be of a predetermined mass that is suitable for subsequent rounding, proofing and baking, to yield baked products all of which are of uniform size, shape, consistency and weight.

The method practiced by the prior art generally comprises the installation of valves in each conduit leading away from the dough distribution manifold toward the dough divider. When the operator of the system detects too much or too little dough moving through one of the conduits, the valve for that conduit is adjusted to adjust the dough flow through the conduit. For example, when a valve is moved more toward its closed position to further constrict the passage of the conduit, the rate of dough moving from the manifold through the conduit to the divider decreases and the back pressure of the dough stream leading toward the valve increases, which leads to increased back pressure in the distribution manifold and in the adjacent ones of the other discharge conduits. Usually, this causes an increased flow through the adjacent conduits but not through the remote conduits. Therefore, in order to adjust the flow of dough through one conduit, the system operator usually is required to adjust the valves of at least the adjacent conduits, and possibly others of the valves of the distribution system. Further, the presence of so many valves to control the system increases the constrictions in the flow paths of the dough and therefore increases the amount of pressure required to drive the system. Further, the placement of valves in each delivery conduit where the cross-section of the dough is relatively small generally functions to require a relatively high pressure drop across the valve, thereby requiring increased back pressure to force the dough past all of the valves, and comprises a constriction in each dough path that causes the dough to change shape and direction of movement.

An example of a prior art dough stream control system is found in U.S. Pat. No. 4,948,611 which teaches that it is essential that each of the dough streams be fine tuned as to the constant velocity of dough by means of throttling valves in each delivery conduit.

In addition, the typical prior art dough distribution manifolds require the dough, and therefore the gluten strands that are interconnected throughout the dough mass, to be torn apart as the dough is divided from one inlet stream into several outlet streams to the dough divider. The tearing of the gluten strands causes the gluten deterioration at the point of rupture as well as requiring greater back pressures to provide the energy to tear the strands. The higher required pressures cause the gluten to age rapidly and increases the dough temperature, the first result causing a deterioration of final product quality and the second making it more difficult to "machine" (round, shape and mold) the final dough ball.

Finally, it is important that all of the dough in the final product proceed through a uniform environment during dough processing, proofing and baking phases. As shown by the cited prior patent, the prior art dough distribution manifolds require the dough to proceed from the entrance of the manifold different distances to the outlets of the manifold and along conduits of differing lengths and varying back pressures and varying residence times to reach the dough divider. The result is a significant variation in product from the outlets of the different conduits.

Therefore, it can be seen that it would be desirable to provide a distribution system for baker's dough that separates the stream of dough leading from the stuffing pump toward the dough divider into a plurality of dough streams that are of equal mass and velocity and with lower driving pressure and lower pressure drop of the dough as the dough moves through the system.

SUMMARY OF THE INVENTION

Briefly described, the present invention comprises a baker's dough distribution manifold for distributing baker's dough from a stream of dough moving from a stuffing pump into multiple delivery outlets. The dough distribution manifold comprises a housing defining a dough distribution chamber, an inlet opening in communication with the distribution chamber for guiding a dough stream to the central portion of the distribution chamber, and a series of dough outlets in communication with the distribution chamber and arranged radially about the distribution chamber. A dough piercing sharp is positioned in the distribution chamber in alignment with the entering dough stream, and a point of the dough piercing sharp faces the inlet opening for piercing the dough substantially at the center of the stream of dough, to cause the dough to spread radially without undue tearing of the gluten structure of the dough.

An array of movable dough deflectors surround the dough distribution chamber, with each deflector interposed between the central portion of the dough distribution chamber and an outlet. Each deflector can be moved to adjust the space provided for the passage of dough from the central portion of the distribution chamber toward its outlet. Thus, the dough stream fans out radially as it is pierced by the dough piercing sharp, so as to form an annulus of dough within the distribution chamber, and the rate of radial movement of the dough in the annulus in each radial direction is influenced by the deflectors.

As the perimeter of the radially moving annulus of dough approaches each outlet, divider sharps positioned between adjacent ones of the outlets slices the dough with minimum tearing or stretching of the dough to form the annulus of dough into separate dough streams that move through each outlet and through each conduit toward the subsequent dough divider.

Thus, it is an object of this invention to provide an improved baker's dough distribution manifold which reliably subdivides a stream of dough into a plurality of dough streams for subsequent dividing into dough balls, which requires a minimum of pressure being applied to the dough stream and which minimizes the stretching and tearing of the dough so as to preserve the gluten structure of the dough.

Further, it is an object of this invention to provide a distribution manifold for baker's dough that is simple in design, inexpensive to construct, durable and which is easy to control.

Another object of this invention is to provide a distribution manifold for handling baker's dough and the like which applies a minimum of resistance to the flow of dough as the dough moves from a stuffing pump to a dough divider and which avoids unnecessary disruption of the gluten structure of the dough.

Another object of the invention is to provide a method of subdividing a stream of dough which pierces the stream to form a radially moving annulus of dough and which divides the annulus into streams of equal masses of dough.

Other objects, features, and advantages of the invention will become apparent upon reading the following specification, when taken in conjunction with accompanying drawings.

BRIEF DESCRIPTION OF THE DRAWINGS

FIG. 2 is a perspective illustration of the six pocket version of the distribution manifold.

FIG. 3 is a front elevational view of the distribution manifold of FIG. 2, in cross-section.

DETAILED DESCRIPTION

Figure 1:
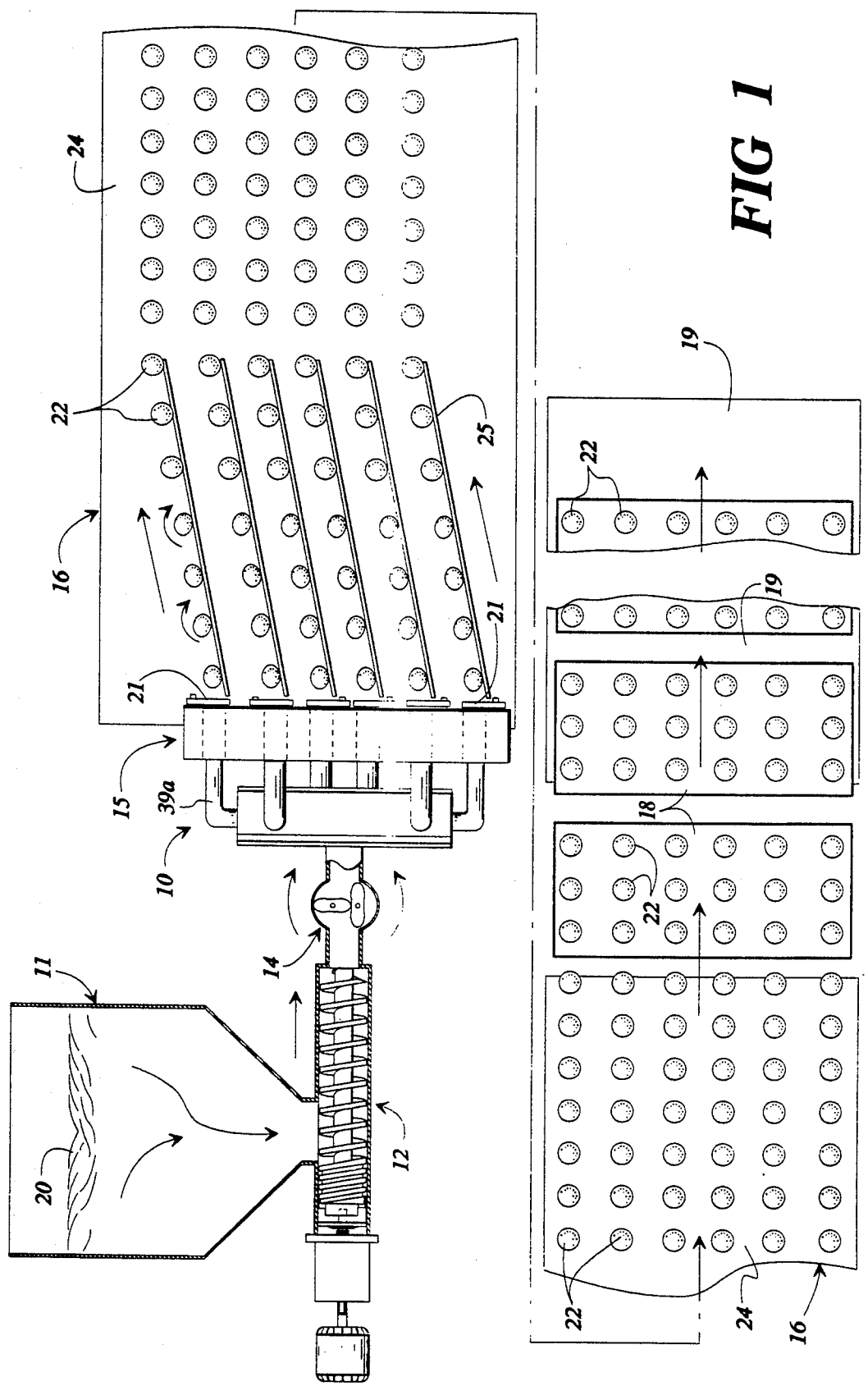
FIG. 1 is a schematic illustration of a dough handling system which shows the general steps of pumping, separating, dividing, rounding and proofing the dough.

Referring now in more detail to the drawings, in which like numerals indicate like parts throughout the several views, FIG. 1 is a flow diagram which shows the progress of the baker's dough moving to and moving away from the dough distribution manifold 10. After the dough has been mixed, it is placed in the mixer hoper 11, is fed to a stuffing pump 12, from the stuffing pump it is urged through a metering pump 14, from the metering pump through the dough distribution manifold 10, from the dough distribution manifold 10 to the dough divider 15, and from the dough divider 15 to the rounder bar conveyor system 16. The dough balls 22 are transferred from the rounder bar conveyor system to individual baker's pans 18, and the baker's pans are then moved through a proofing box 19, and on to a subsequent oven (not shown).

The dough 20 is originally formed in a relatively dense, viscous mass, and while it is flowable with the use of the stuffing pump 12, the dough typically does not flow through the system by gravity, but must be positively moved. Further, the baker's dough has a gluten structure which desirably is preserved as well as practical as the dough moves through the processing system.

The dough is moved in one continuous stream from the mixer 11, through stuffing pump 12 and metering pump 14. As the dough moves through dough distribution manifold 10, the dough is divided into a multiple of number of dough streams, typically 4, 6 or 8 streams, depending upon the construction of the dough distribution manifold. As the dough moves through dough divider 15, a dough cutter blade 21 sweeps across each opening of the dough divider to cut the dough emerging therefrom into separate dough balls 22, with the dough balls dropping onto the surface conveyor belt 24 of the rounder bar conveyor system 16. A rounder bar 25 is suspended in a stationary position over the surface conveyor 24 and in alignment with each dough ball 22 as the dough ball is dropped to the conveyor 24. The rounder bars function to turn the dough balls 22, to develope the outside surface of each dough ball into a "skin". A prior art stuffing pump is taught in U.S. Pat. No. 4,517,212, prior art dough dividers are taught in U.S. Pat. Nos. 4,332,538 and 4,948,611, a prior art dough divider is taught in U.S. Pat. No. 4,948,611, and prior art rounder bar conveyor systems are taught in U.S. Pat. Nos. 4,008,025 and 4,306,850.

FIG. 2 illustrates the exterior of dough distribution manifold 10, which includes housing 28, inlet conduit 29 and a series of outlet conduits 30a-30f which extend radially from the housing 28. Housing 28 includes base 31 and cover plate 32, with the cover plate being attached to the base by bolts 34. The inlet conduit 29 is mounted to an opening 35 formed in cover plate 32.

Figure 4A:
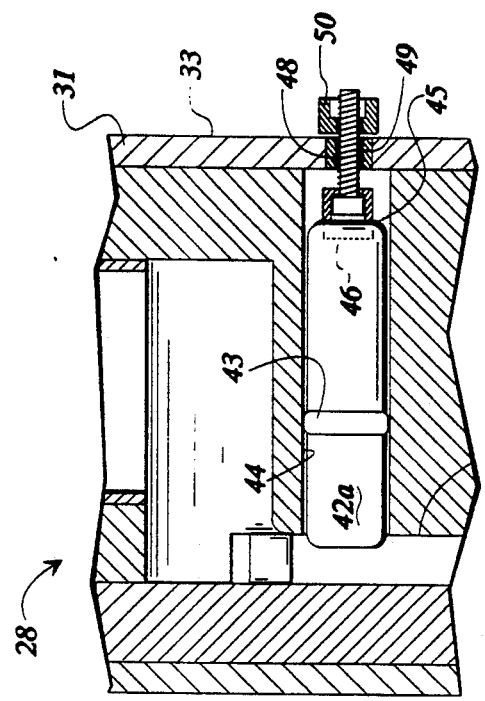
FIG. 4a is a detail cross section of a dough deflector.
Figure 4:
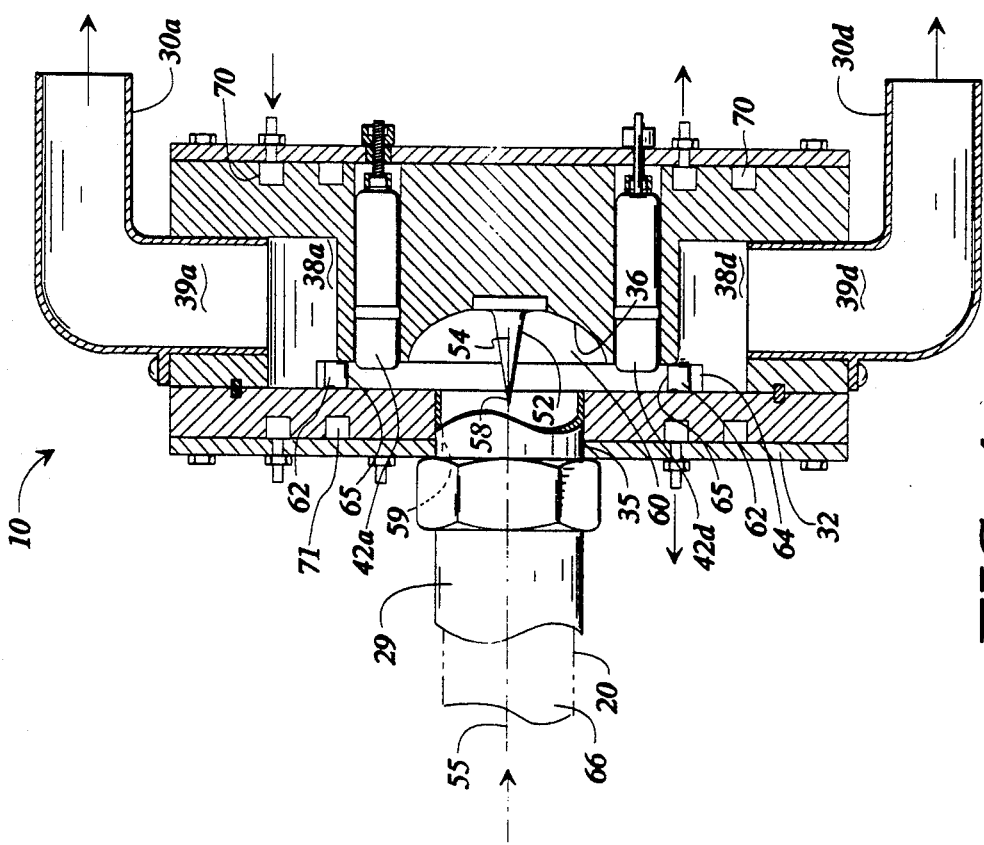
FIG. 4 is a side elevational view of the distribution manifold of FIGS. 2 and 3, in cross-section.

As best illustrated in FIGS. 3 and 4, base 31 of housing 28 of the dough distribution manifold 10 includes a centrally positioned recess 36, circumferentially positioned outlet pockets 38a-38f, radially extending outlet ports 39a-39f which extend from the outlet pockets to the cylindrical side wall 40 of housing 28. Each outlet conduit 30a-30f is mounted to and in communication with an outlet port 39a-39f, respectively. A plurality of adjustable dough deflectors 42a-42f are mounted in a circumferential array about the centrally positioned recess 36, with each deflector being aligned radially with a dough outlet pocket 38a-38f, respectively.

As illustrated in FIG. 4A, each deflector 42a-42f includes an O-ring seal 43 and is telescopically received in a slot 44 formed in base 31 of housing 28, and each deflector has mounted to its interior end 45 a socket 46 with which rotatably receives threaded adjustment screw 48. Adjustment screw 48 extends through threaded collar 49, and lock nut 50 is positioned outside the base 31 of the housing 28 and threadedly engages the adjustment screw so as to lock against the threaded collar 49. By loosening the lock nut 50 and rotating the adjustment screw 48, the axial position of the deflector can be adjusted within its slot 44. Further, the distance of protrusion of the adjustment screw 48 from the rear surface 33 of the housing 31 provides a visual indicator as to the position of the deflector inside the housing 28, particularly with respect to the distance that the deflector protrudes from its slot 44.

As best illustrated in FIGS. 3 and 4, a dough piercing sharp 52 is mounted in base 31 of housing 28 in alignment with inlet conduit 29. Dough piercing sharp 52 comprises a pointed spike with its longitudinal axis 54 aligned with the longitudinal axis 55 of inlet conduit 29. The interior pointed end 58 of spike 52 protrudes into the delivery end portion 69 of inlet conduit 29. The recess 36 formed in base 31 is concave, with its central portions surrounding spike 52 and forming an extension of the slope of the pointed end of the spike, so that there is a substantially smooth transition from the conical pointed end 58 of the spike to the recess 36. The recess 36 curves so that its surface approaches cover plate 32 adjacent the dough deflectors 42a-42f.

The arrangement of the dough piercing sharp 52 with the concave surface of recess 36 is to form a dough distribution recess generally indicated by numeral 60 which is formed between base 31 and cover plate 32 of the housing 28. The annular shape of the dough distribution recess is such that a relatively constant cross-sectional area is formed for the dough as the dough travels from the pointed end 58 of the dough piercing sharp 52 along the facing surfaces of the cover plate 32 and the base 31 to the deflectors 42a-42f. This relatively constant cross-sectional area of the dough tends to cause the dough to move at a constant velocity through the dough distribution chamber 60. Further, the portion of the dough distribution chamber 60 between the base 31 and cover plate 32 which is radially inside the dough deflectors 42a-42f comprises an annulus through which the dough moves and the dough therefore is formed in an annulus (FIG. 5) as it moves through the distribution manifold 10.

A plurality of dough divider sharps 62 (FIG. 3) are spaced circumferentially around the base 31, between each outlet pocket 38a-38f. Each dough divider sharp 62 is received in a slot 64 formed in base 31, and each dough divider sharp has a slicing knife edge 65 facing the dough distribution chamber 60. The knife edge 65 of each divider sharp 62 functions to slice the radially moving dough as the dough expands radially from the distribution chamber 60 toward outlet pockets 38a-38f.

Figure 5:
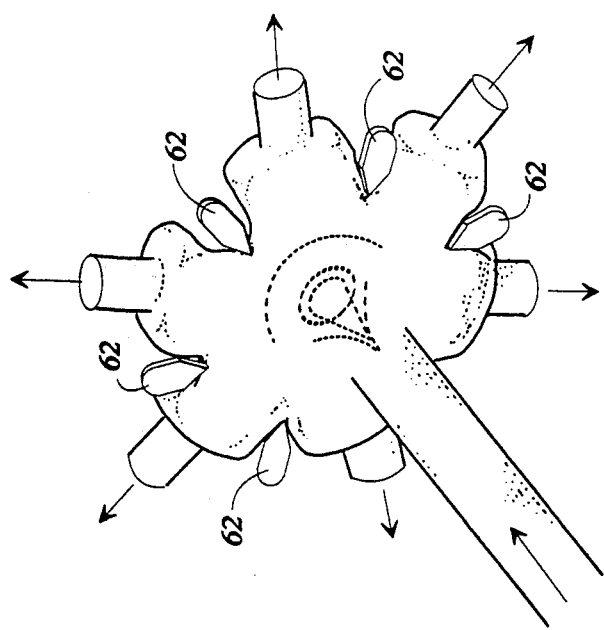
FIG. 5 is a perspective illustration of the annulus of dough as it makes the transition from the original main dough stream, is formed into an annulus, and then is delivered to six separate dough streams.

As illustrated in FIG. 4, the dough piercing sharp 52 is oriented at the center of the oncoming stream 66 of dough 20 as the dough passes through the inlet conduit 29. The sharp tends to open the dough and deflect the dough radially with only a minimum of tearing and shearing of the dough, so as to generally preserve the gluten structure of the dough as it makes this transition. The sharp positively locates the center of the annulus of dough and causes the dough on all sides of the sharp to be committed to flow radially away from the sharp. As shown in FIGS. 4 and 5, the dough becomes formed in an annulus shape which is thicker near the middle of the annulus and feathers out to a thinner shape near the perimeter of the annulus.

As the dough reaches the perimeter of the annulus, the deflectors 42a-42f protrude inwardly of the space formed between the base 31 and cover plate 32, forming a slight constriction and therefore a pressure drop in the dough as the dough moves from the distribution chamber 60 over the protruding ends of the deflectors. The deflectors can be adjusted from outside the housing 28 so as to adjust the rate of movement of the dough into each of the outlet pockets 38a-38f.

Therefore, the dough deflectors 42a-42f function as dough distribution means. Further, as the dough moves into each outlet pocket 38a-38f, the radially expanding dough is sliced by the dough divider sharps 62 which are positioned between each outlet pocket 38. Again, the slicing action of the dough divider sharps 62 tends to avoid unnecessary stretching and tearing of the dough as the dough is divided into separate streams that enter each outlet pocket 38.

Once the now divided dough streams reach on outlet pocket 38a-38f, the dough moves through outlet ports 39a-39f and out of the dough distribution manifold 10, into delivery conduits 30a-30f. The delivery conduits 30a-30f are shaped so as to be substantially of equal length, so that the streams of dough reaching dough divider 15 (FIG. 1) is equally aged, of equal density and is moving at equal velocity.

A feature of the invention is that the dough from dough stream 66 entering the dough distribution manifold 10 is adjusted in velocity and pressure by the individual adjustment of each of the deflectors 42a-42f, and no further adjustment is required of each dough stream moving away from the distribution manifold 10. The deflectors 42a-42f work directly on the annulus of dough as the dough moves through the manifold, with a minimum of pressure drop being applied to the dough and with a relatively smooth transition of the dough from the inlet conduit 29 to the multiple delivery conduits 30a-30f.

Internal cooling conduits 70 can be arranged in base 31 of housing 28, while similar internal cooling conduits 71 can be arranged in cover plate 32. Cooling conduits 70 and 71 communicate with chilled water or glycol, and function to drop the temperature of the dough which comes in contact with the surfaces of base 31 and cover plate 32. The dough that contacts base 31 and cover plate 32 tends to form the outside of the dough streams moving through the delivery conduits 30a–30f to the divider 15. Therefore, the exterior or skin of the dough tends to form the exterior or skin of the dough balls 22 (FIG. 1). This reduced exterior surface temperature of the dough balls tends to cause the dough balls to avoid clinging to the surfaces of the rounder conveyor system 16. Further, since the interior of each dough ball 22 remains slightly warmer than the exterior, when the dough balls reach the proofing box 19, the proofing box is not required to raise the temperature of the interior of the dough ball from the lower temperature, thereby reducing proofing time and saving some energy in the process.

Figure 6:
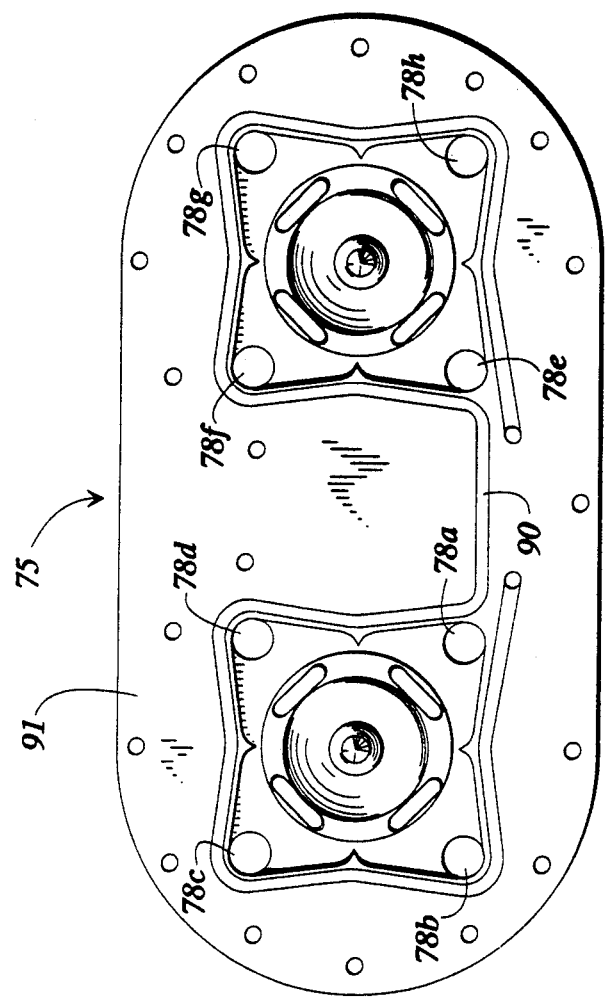
FIG. 6 shows a second embodiment of the invention and comprises a front elevational view, in cross-section of an eight-pocket dough distribution manifold.

FIG. 6 shows a dough distribution manifold 75 that includes two distribution chambers 76 and 77 and which has a total of eight dough outlet pockets 78a–78g which lead to outlets and outlet conduits (not shown). Dough divider sharps 84 are positioned between the outlet pockets 78a–78g for dividing the radially expanding dough into separate streams that enter the dough outlet pockets. This enables the system to provide eight streams of dough with streams of equal length to a dough divider for dividing the streams of dough into eight rows of dough balls on a rounder bar conveyor system. However, the principles of the invention set forth in FIGS. 1-5 are substantially the same, in that dough piercing sharps 79 and 80 are used to form the oncoming stream of dough into an annulus, the deflectors 81a–81g are used to control the outer perimeter of the annulus, and the dough divider sharps 84 slice the dough into separate streams, thereby avoiding the placement of valves and other adjustment means in the streams of dough moving to the dough divider. A cooling channel 90 extends about the base 91 and is closed by the cover plate (not shown) which forms the channel into a cooling duct for the movement therethrough of the cooling liquid.

While the invention has been described in specific embodiments in the foregoing specification and drawing, it would be understood by those skilled in the art that variations and modifications of the disclosed embodiments can be made without departing from the spirit and scope of the invention as set forth in the following claims.

I claim:

1. A method of dividing baker's dough from a single stream of dough into separate streams of equal weight comprising:

passing the stream of dough toward a dough piercing sharp, piercing the stream of dough substantially at the center of the stream of dough with the dough piercing sharp to form the dough in an annulus, spreading the annulus of dough radially from the dough piercing sharp toward a plurality of dough outlets, and as the dough spreads radially from the dough piercing sharp in the form of an annulus toward the outlets, controlling the rate of movement of the annulus of dough toward each outlet.

2. The method of dividing baker's dough of claim 1 and further including the step of moving the annulus of dough into engagement with divider sharps positioned between each outlet to divide the dough into separate streams of dough and moving each separated stream of dough through an outlet.

3. The method of dividing baker's dough of claim 1 and wherein the step of controlling the rate of movement of the annulus of dough toward each outlet comprises placing a movable deflector in the path of the annulus of dough as the dough moves toward each outlet and adjusting the deflector.

4. A method of dividing baker's dough from a single stream of dough into separate streams of equal weight comprising:

piercing the stream of dough substantially at the center of the stream of dough;

moving the dough in an uninterrupted condition radially toward a plurality of dough outlets;

separating the radially moving dough into a plurality of separate streams, and passing the separate streams of dough through the outlets.

5. The method of dividing baker's dough of claim 4 and further including the step of controlling the rate of movement of the radially moving dough as the dough moves toward the dough outlets.

6. The method of dividing baker's dough of claim 4 and wherein the step of separating the radially moving dough comprises passing the radially moving dough into engagement with divider sharps positioned between each dough outlet to divide the dough into separate streams of dough.

7. The method of dividing baker's dough of claim 4 and wherein the step of moving the dough in an uninterrupted condition radially toward a plurality of dough outlets comprises passing the dough in the shape of an annulus toward the plurality of dough outlets, further including the step of controlling the movement of the annulus of dough toward each dough outlet.

* * * * *